United States Patent [19]

Lichtenberg

[11] Patent Number: 5,293,785
[45] Date of Patent: Mar. 15, 1994

[54] ADJUSTABLE CABLE STRAND END FITTING

[75] Inventor: Norman B. Lichtenberg, Troy, Mich.

[73] Assignee: Nagle Industries, Inc., Clawson, Mich.

[21] Appl. No.: 760,724

[22] Filed: Sep. 17, 1991

[51] Int. Cl.⁵ .............................................. F16C 1/10
[52] U.S. Cl. ................... 74/500.5; 74/501.5 R; 74/502.4; 74/502.5; 74/502.6
[58] Field of Search ............ 74/501.5 R, 500.5, 502.4, 74/502.5, 502.6

[56] References Cited

U.S. PATENT DOCUMENTS

| | | | |
|---|---|---|---|
| 3,744,339 | 7/1973 | Martinson | 74/500.5 |
| 4,007,647 | 2/1977 | Carlson | 74/501 R |
| 4,023,435 | 5/1977 | LaDue | 74/501 P |
| 4,261,221 | 4/1981 | Kobayashi | 74/501 R |
| 4,334,438 | 6/1982 | Mochida | 74/501 R |
| 4,694,706 | 9/1987 | Lichtenberg et al. | 74/502.4 X |
| 4,805,479 | 2/1989 | Brightwell | 74/502.4 |
| 4,833,937 | 5/1989 | Nagano | 74/502.4 X |
| 4,841,805 | 6/1989 | Italiano | 74/500.5 X |
| 4,903,541 | 2/1990 | Shiota | 74/500.5 X |
| 4,936,161 | 6/1990 | Polando | 74/502.6 |
| 5,156,063 | 10/1992 | Kelley | 74/501.5 R |
| 5,156,064 | 10/1992 | Truman | 74/501.5 R |
| 5,174,170 | 12/1992 | Kato et al. | 74/501.5 R |

Primary Examiner—Leslie A. Braun
Assistant Examiner—Andrea Pitts
Attorney, Agent, or Firm—Dinnin & Dunn

[57] ABSTRACT

A cable strand end fitting includes a housing adapted to be attached to a mounting member and having a passageway extending therethrough. The cable strand end fitting also includes a screw member including a passageway extending therethrough, whereby a strand extends through the passageway and has a retainer member which abuts the screw member. The cable strand end fitting includes a structure for adjusting the tension in the strand.

4 Claims, 2 Drawing Sheets

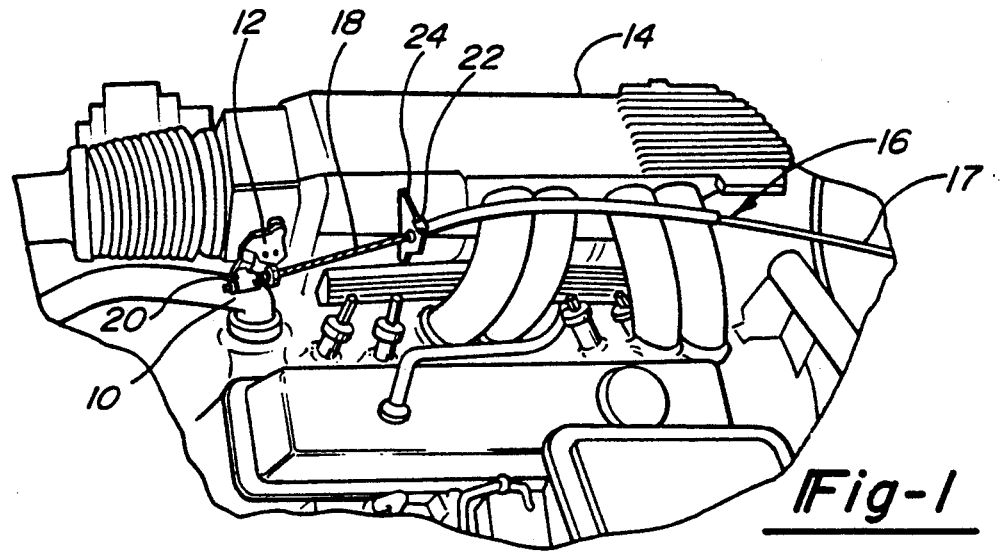
Fig-1
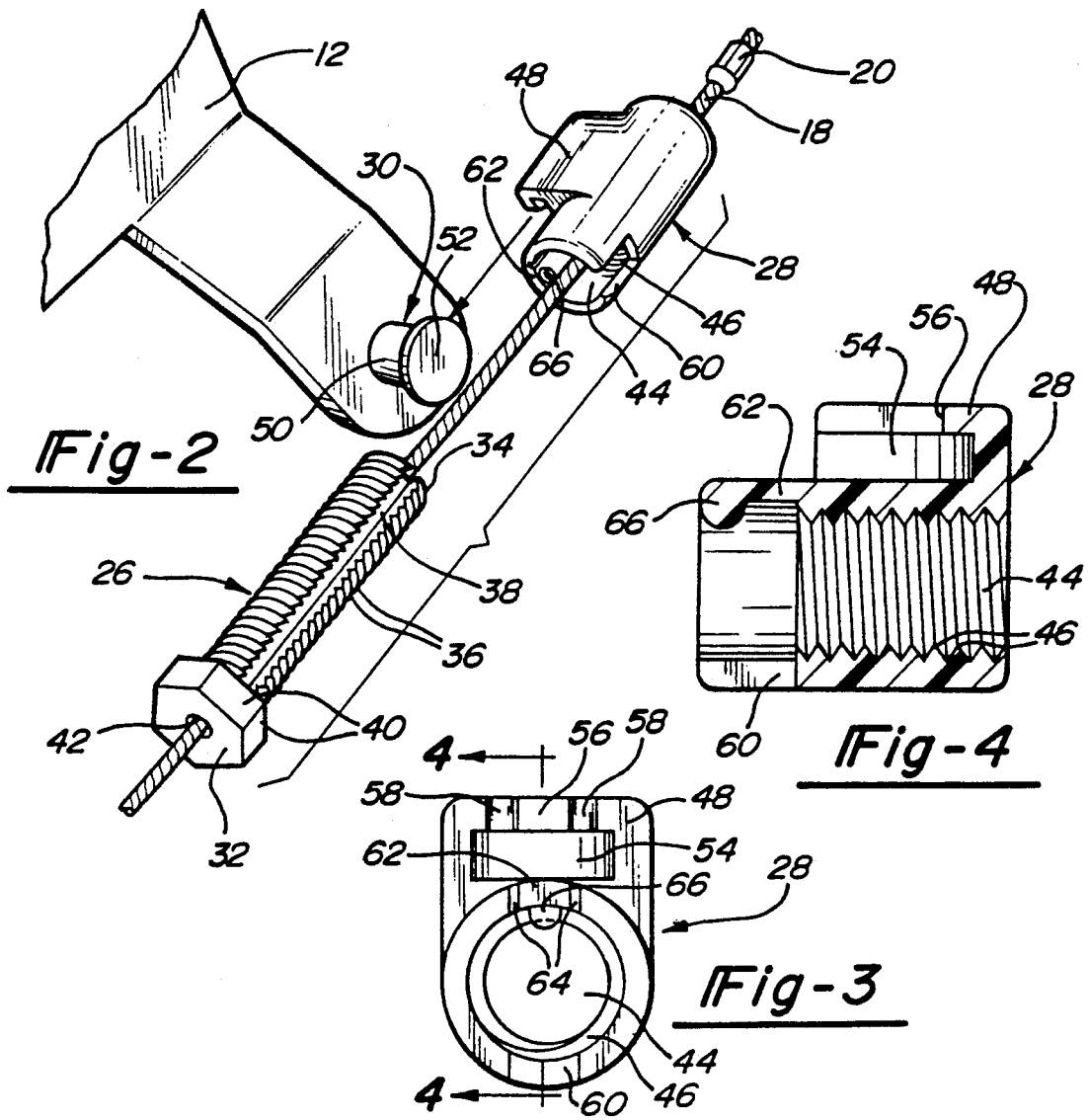
Fig-2
Fig-3
Fig-4

ADJUSTABLE CABLE STRAND END FITTING

BACKGROUND OF THE INVENTION

1. Field of the Invention

The present invention relates generally to cable end fittings and more particularly, to a cable end fitting for adjusting the tension in a strand.

2. Description of the Related Art

Cable strand end fittings are typically mounted on a mounting post of a carburetor or throttle body for an engine. A strand of a motion control cable extends through the end fitting and has a member staked onto the end of the strand to prevent the strand from exiting the end fitting. However, there is no adjustment mechanism on the end fitting to allow the slack or tension in the strand to be varied or adjusted.

Positioning devices have been used in the past to position an end of a conduit for a motion control cable. An example of such a positioning device is disclosed in U.S. Pat. No. 4,261,221 to Kobayashi. This patented positioning device included an inner cable slidably disposed within a conduit and a screw member secured to the end of the conduit. An outer fitting is secured to an engagement plate and has a threaded passage. The screw member engages the threaded passage in the outer fitting to position the conduit relative to the outer fitting.

One problem of the above patented positioning device is that the conduit is adjusted and not the strand or cable. Another problem with the positioning device is that a spring is used to prevent rotation between the screw member and outer fitting. A further problem is that the positioning device is costly to manufacture.

SUMMARY OF THE INVENTION

It is, therefore, one object of the present invention to provide an adjustable cable strand end fitting.

It is another object of the present invention to provide a cable end fitting which allows the slack or tension in a strand to be adjusted.

It is yet another object of the present invention to provide an adjustable cable end fitting which eliminates a separate spring.

It is still another object of the present invention to provide an adjustable cable end fitting which is less costly to manufacture.

It is a further object of the present invention to provide a cable strand end fitting which is easier to assemble onto a throttle body fitting.

It is yet a further object of the present invention to provide a new and improved cable strand end fitting.

To achieve the foregoing objects, the present invention is a cable strand end fitting including a housing having means for attachment to a mounting member and means forming a passageway extending therethrough. The cable strand end fitting also includes a screw member including means forming a passageway extending therethrough, whereby a strand extends through the passageway and has a retainer member which abuts the screw member. The cable strand end fitting includes means for adjusting the tension in the strand.

One advantage of the present invention is that the cable strand end fitting is adjustable. Another advantage of the present invention is that the cable strand end fitting allows the slack or tension in the strand to be adjusted or varied. A further advantage of the present invention is that the cable end fitting eliminates a spring and is less costly to manufacture.

Other objects, features and advantages of the present invention will be readily appreciated as the same becomes better understood after reading the following description taken in conjunction with the accompanying drawings.

BRIEF DESCRIPTION OF THE DRAWINGS

FIG. 1 is a perspective view of an adjustable cable strand end fitting according to the present invention illustrated on an engine.

FIG. 2 is a perspective exploded view of the adjustable cable strand end fitting of FIG. 1.

FIG. 3 is an elevational view of a housing of the adjustable cable strand end fitting of FIG. 2.

FIG. 4 is a sectional view taken along line 4—4 of FIG. 3.

DESCRIPTION OF THE PREFERRED EMBODIMENT(S)

Figure 5:
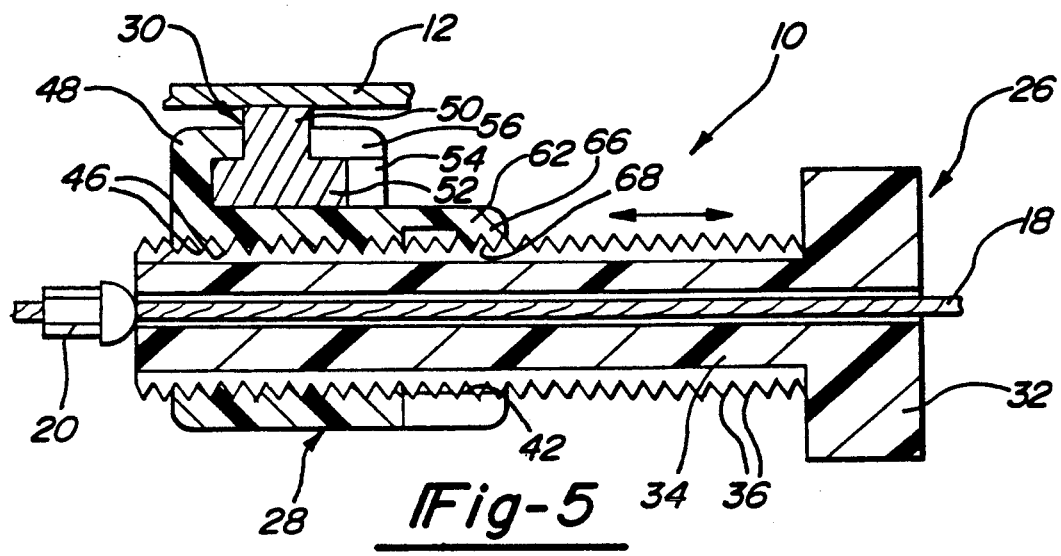
FIG. 5 is a fragmentary view of the adjustable cable strand end fitting of FIG. 1.

Referring to FIG. 1, an adjustable cable strand end fitting 10 according to the present invention is shown. The strand end fitting 10 is adapted to be fixed to a mounting member 12 such as a moveable flange on a carburetor or throttle body of an engine 14. The strand end fitting 10 is also adapted to cooperate with a motion control cable, generally indicated at 16. The motion control cable 16 has a conduit 17 and a strand or cable 18 slidably disposed within the conduit 17. The strand 18 has one end received by the strand end fitting 10 with a retainer member 20 staked at one end of the strand 18. The other end of the strand 18 is attached to a moveable operator pedal or control mechanism, such as a cruise control servo motor (not shown). The motion control cable 16 includes an attachment member 22 to attach the conduit 17 to a fixed engagement plate or flange 24 on the engine 14. It should be appreciated that the conduit 17 is fixed relative to the engagement flange 24. It should also be appreciated that the strand 18 moves relative to the engagement flange 24 and conduit 17 and that such movement may cause the moveable flange on the carburetor to move or rotate.

Referring to FIG. 2, the cable strand end fitting 10 includes a screw member, generally indicated at 26, adapted to receive the strand 18 and a housing, generally indicated at 28, adapted to cooperate with the screw member 26. The housing 28 is adapted to be removably secured to a mounting post 30 of the mounting member 12. Preferably, the screw member 26 and housing 28 are made of a plastic material such as polycarbonate. It should be appreciated that the screw member 26 and housing 28 may be made of any suitable material such as metal.

Referring to FIG. 2 through 4, the screw member 26 has a head portion 32 and a body portion 34 extending longitudinally from the head portion 32. The body portion 34 is generally cylindrical in shape and has a plurality of threads 36. The body portion 34 also has at least one, preferably a pair of grooves 38 which diametrically oppose each other and extend longitudinally along the length of the body portion 34. The grooves 38 interrupt the threads 36 such that the threads are non-continuous. The head portion 32 is enlarged and has a diameter greater than a diameter of the body portion 34. The head portion 32 includes a plurality of flats 40 to form a hexagon shape. The screw member 26 also includes a passageway 42 extending longitudinally through the head portion 32 and body portion 34. It should be appreciated that the strand 18 extends through the passageway 42.

The housing 28 is generally cylindrical in shape and includes a passageway 44 extending longitudinally therethrough. The housing 28 includes a plurality of threads 46 extending partially along the passageway 44. The threads 46 are adapted to cooperate with the threads 36 of the screw member 26. The housing 12 also includes an attachment portion 48 adapted to be mounted or attached to the mounting post 30. As illustrated in FIG. 2, the mounting post 30 has a mounting portion 50 and post portion 52. The mounting portion 50 has a diameter greater than a diameter of the post portion 52. The attachment portion 48 extends radially outwardly and longitudinally from one end of the housing 28 to form a space 54 therebetween to receive the mounting portion 50 of the mounting post 31. The attachment portion 48 has a slot 56 to receive the post portion 52 of the mounting post 30 and allow the mounting portion 50 to be seated at one end of the space 54. The attachment portion 48 also has a pair of opposed projections 58 extending inwardly into the slot 56 which are adapted to flex and retain the post portion 52 therein.

The housing 28 also includes a slot 60 at one end. The slot 60 is generally rectangular in shape. The housing includes a finger 62 opposite the slot 60. The finger 62 is formed by a pair of slots 64 extending inwardly into the housing 28 such that the finger 62 is supported in a cantilevered manner. The finger 62 is deflectable and attached at one end to the remainder of the housing 28. The finger 62 includes a projection 66 extending radially into the passageway 44 and adapted to cooperate with the grooves 38 of the screw member 26.

Figure 6:
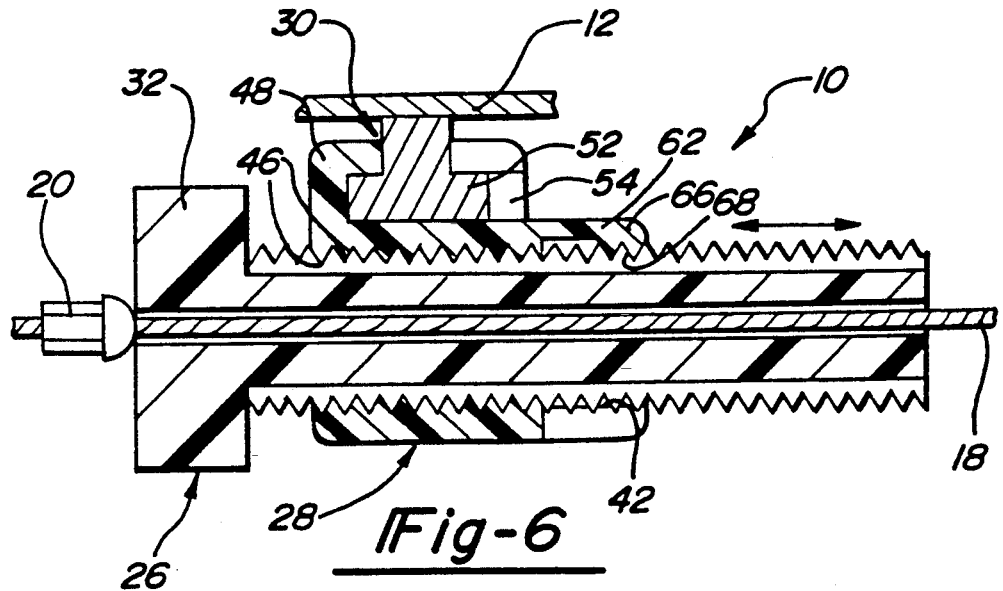
FIG. 6 is view similar to FIG. 5 illustrating alternate operation of the adjustable cable strand end fitting of FIG. 1.

Referring to FIGS. 5 and 6, in operation, the housing 28 is attached to the mounting post 30 on the mounting member 12. The attachment portion 48 of the housing 2 is moved longitudinally such that the mounting portion 52 of the mounting post 30 is received in the space 54. The attachment portion 48 continues to move longitudinally such that the post portion 50 moves along the slot 56 and deflects the projections 58 and is moved past the projections 58 to seat the mounting portion 52 at the end of the space 54. The strand 18 is extended through the passageway 42 of the screw member 26 such that the retainer member 20 abuts either the end of the body portion 34 or head portion 32 of the screw member 26 as illustrated in FIGS. 5 and 6, respectively. The screw member 26 is moved longitudinally into the passageway 44 of the housing 28 such that the projection 66 of the finger 62 travels along one of the grooves 38 of the screw member 26. When the end of the body portion 34 reaches the threads 46, the screw member 26 is rotated such that the threads 36 and 46 engage each other.

Upon rotation of the screw member 26, the projection 66 engages the threads 36 and moves the finger 62 radially. As a result, the projection 66 moves out of the groove 38 and rides along the threads 36 until reaching the next groove 38 and is disposed therein. It should be appreciated that, when the projection 66 is disposed in the groove 38, rotation between the screw member 26 and housing 28 is resisted. It should also be appreciated that since one end of the strand 18 is fixed, the screw member 26 is rotated and the engagement between the screw member 26 and retainer member 20 pulls on the strand 18 until the desired tension or slack in the strand 18 is achieved.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A motion control assembly comprising:
   a conduit fixed relative to movement and a strand extending through said circuit and moveable relative to said conduit;
   a strand end fitting removably fixed to a movable member and receiving one end of said strand, whereby movement of the other end of the strand moves the strand end fitting and moveable member; and
   said strand end fitting comprising a housing attached to the moveable member and having means forming a passageway with a plurality of internal threads therealong and a rotatable screw member having a plurality of external threads cooperating with said internal threads for adjusting tension in said strand.

2. A motion control assembly as set forth in claim 1 including means for preventing said strand from exiting said passageway.

3. A motion control assembly comprising:
   a conduit fixed relative to movement and a strand extending through said conduit and moveable relative to said conduit;
   a strand end fitting removably fixed to a moveable member and receiving one end of said strand, whereby movement of the other end of the strand moves the strand end fitting and moveable member;
   said strand end fitting comprising a housing attached to the moveable member and a rotatable screw member cooperating with said housing and having means forming a first passageway extending therethrough, said strands extending through said first passageway;
   means for preventing said strand from exiting said first passageway;
   said housing including means forming a second passageway extending therethrough; and
   wherein said strand end fitting including a plurality of first threads partially along said second passageway of said housing and a plurality of second threads along said rotatable screw member, said first and second threads being engageable with each other for adjusting tension in said strand.

4. A motion control assembly comprising:
   a conduit fixed relative to movement and a strand extending through said conduit and moveable relative to said conduit;
   a strand end fitting removeably fixed to a moveable member and receiving one end of said strand, whereby movement of the other end of the strand moves the strand end fitting and moveable member;

said strand end fitting comprising a housing attached to the moveable member and a rotatable screw member cooperating with said housing and having means forming a first passageway extending therethrough, said strand extending through said first passageway;

means for preventing said strand from exiting said first passageway;

said housing including means forming a second passageway extending therethrough;

said strand end fitting including a plurality of first threads partially along said second passageway of said housing and a plurality of second threads along said rotatable screw member, said first and second threads being engageable with each other for adjusting tension in said strand;

means for resisting rotation of said rotatable screw member relative to said housing; and wherein said resisting means comprises a pair of opposed grooves extending longitudinally along said rotatable screw member and a finger extending longitudinally from said housing and having a projection engageable with at least one of said grooves.

* * * * *

UNITED STATES PATENT AND TRADEMARK OFFICE
CERTIFICATE OF CORRECTION

PATENT NO. : 5,293,785
DATED : March 15, 1994
INVENTOR(S) : Norman B. Lichtenberg It is certified that error appears in the above-identified patent and that said Letters Patent is hereby corrected as shown below:

Column 3, line 44, "2" should be --28--.

Column 4, line 19, claim 1, "circuit" should be --conduit--.

Column 4, line 50, claim 3, "strands" should be --strand--.

Signed and Sealed this

Twenty-sixth Day of July, 1994

Attest:

BRUCE LEHMAN

*Attesting Officer*  *Commissioner of Patents and Trademarks*